Patented Feb. 9, 1954

2,668,812

UNITED STATES PATENT OFFICE 2,668,812

PENICILLIN SALT OF N,N'-BIS-p,p'-CARBODIETHYLAMINOETHOXYPHENYL UREA

Ralph N. Lulek, Rosebank, N. Y., and William M. Ziegler, Clementon, N. J., assignors, by mesne assignments, to American Cyanamid Company, New York, N. Y., a corporation of Maine No Drawing. Application January 16, 1951, Serial No. 206,310

1 Claim. (Cl. 260—239.1)

This invention relates to new chemical compounds and to improved processes by which they may be prepared. More particularly, it is concerned with the penicillin salts of procaine urea and to methods used in the preparation of these antibiotics.

The compounds forming the subject matter of the present invention may be represented by the following structural formula:

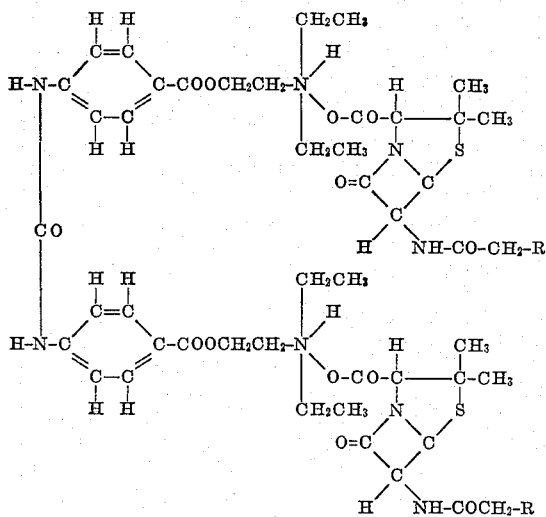

wherein R represents a phenyl or p-hydroxy phenyl group.

The most important compound of the above mentioned group is the benzyl penicillin salt of procaine urea, alternatively referred to as either the penicillin salt of N,N'-bis-p,p'-carbodiethylaminoethoxyphenyl urea or the penicillin salt of 4,4' - di - (β-diethylamino) carbethoxy diphenyl urea.

It should also be mentioned that the bio-synthetic forms of penicillin are likewise considered to be within the purview of this invention.

It has now been discovered, in accordance with the present invention, that one effective method whereby one of the compounds represented by the above formula, the benzyl penicillin salt (penicillin G) of procaine urea, can be prepared, consists of a metathesis reaction between the potassium salt of benzyl penicillin and an acid salt of N,N'-bis-p,p'-carbodiethylaminoethoxyphenyl urea. This reaction is indicated graphically as follows:

$$CO[NHC_6H_4COOC_2H_4N(C_2H_5)_2 \cdot HCl]_2 + 2KOCOC_{15}H_{17}O_2N_2S \longrightarrow$$
$$2KCl + CO[NHC_6H_4COOC_2H_4N(C_2H_5)_2 \cdot HOCOC_{15}H_{17}O_2N_2S]_2$$

An alternative method for preparing the above indicated compound involves reacting the acidified benzyl penicillin salt with N,N'-bis-p,p'-carbodiethylaminoethoxyphenyl urea. This reaction is indicated graphically as follows:

$$KOCOC_{15}H_{17}O_2N_2S + HCl \longrightarrow HOCOC_{15}H_{17}O_2N_2S + KCl$$
$$CO[NHC_6H_4COOC_2H_4N(C_2H_5)_2]_2 + 2HOCOC_{15}H_{17}O_2N_2S \longrightarrow$$
$$CO[NHC_6H_4COOC_2H_4N(C_2H_5)_2 \cdot HOCOC_{15}H_{17}O_2N_2S]$$

N,N'-bis-p,p'-carbodiethylaminoethoxyphenyl urea (benzyl penicillin salt of procaine urea)

N,N' - bis - p,p' - carbodiethylaminoethoxyphenyl urea, together with a method for its preparation, are disclosed and claimed in a co-pending application of one of the present applicants, R. N. Lulek, Serial No. 64,241, filed December 8, 1948, and which issued as U. S. Patent No. 2,539,848 on January 30, 1951.

Regarded in certain of its broader aspects, the novel features in the present invention comprise the preparation of penicillin salts of N,N'-bis-p,p'-carbodiethylaminoethoxyphenyl urea by directly reacting a penicillin salt with an acid salt of N,N'-bis-p,p'-carbodiethylaminoethoxyphenyl urea, or in a modification thereof, by reacting an acidified penicillin salt with N,N'-bis-p,p'-carbodiethylaminoethoxyphenyl urea, then extracting the penicillin salt thus formed by the use of an appropriate water immiscible organic solvent, concentrating the solvent portion containing the antibiotic, and then recovering and washing the penicillin salt with a suitable solvent. The yield obtained is quantitative, the product being a white solid, in substantially pure form.

The dry stable salts thus produced had a melting point ranging between 68°–75° C. and assayed chemically (using a standard method) about 800 u./mg. A bio-assay of this material, using S. aureus in a cylinder plate method, was about 1,000 u./mg. The aforementioned new and novel salts of penicillin possess the antibacterial activity characteristic of penicillin salts and likewise are quite suitable for therapeutic uses. The results of the bio-assay indicate the purity of these salts and their suitability in the preparation of various formulations such as, a suspension of the salt in a menstruum of either peanut oil or sesame oil for prolonged blood levels, or an aqueous suspension useful for parenteral injections. These penicillin salts can likewise be prepared in other forms such as, tablets, troches, etc.

In a more specific embodiment of this invention, an aqueous solution of a penicillin salt such as sodium or potassium benzyl penicillin, is reacted with an inorganic acid salt of N,N'-bis - p,p' - carbodiethylaminoethoxyphenyl urea thereby producing by a metathesis reaction, the benzyl penicillin salt of N,N'-bis-p,p'-carbodiethylaminoethoxyphenyl urea. Inorganic acid salts which have been found to be suitable in this reaction include the hydrochloride, sulfate, phosphate, etc.

A modification of this process comprises acidifying a solution of the penicillin salt with a concentrated inorganic acid such as hydrochloric, sulfuric, or phosphoric acid, and then reacting the acidified penicillin salt with N,N'-bis-p,p'-carbodiethylaminoethoxyphenyl urea to obtain the desired product.

The penicillin salt thus formed is separated from the reaction mixture by the use of an appropriate water immiscible organic solvent. Solvents which have been found to be highly satisfactory in this extraction step include chloroform, amyl acetate, methyl amyl acetate, methyl isobutyl ketone, etc. Since, however, excellent results are obtained when chloroform is employed, the use of this solvent is preferred.

It should be mentioned that the solvent should also be relatively inert to penicillin; that is, should not either destroy or adversely affect the antibiotic activity of this drug.

Since various penicillin salts of N,N'-bis-p,p'-carbodiethylaminoethoxyphenyl urea are soluble in the water-containing organic solvent and likewise are soluble in the dried solvent, the conventional methods of concentrating these penicillin salts are ineffectual when used to isolate the desired product. Instead, the solution is dried over anhydrous salt, concentrated, and then precipitated by the addition of ether. The salt is further washed with a solvent such as ether or ligroin and then dried over sulfuric acid or any other suitable dehydrating agent. The final product is recovered in substantially pure white powdery form. As in the case of other penicillin salts, i. e. sodium or potassium benzyl penicillin, it is essential that this salt be converted to the dry powdered form as soon as possible because of the instability of the penicillin salts generally, in any solution containing water.

Because of the sensitivity of the penicillin molecule, especially in strongly acidic and strongly alkaline solutions, the reaction and the steps in the process generally must be conducted at a low temperature, i. e. at temperatures varying between 0° to 35° C., with a preferred temperature range between 25° to 30° C., to prevent any degradation of the antibiotic with attendant loss of antibiotic activity. Thus, external cooling means are used to cool the solution when the temperature rises beyond the limits specified above.

The following examples are representative of the procedures embodied in the present invention, but it is to be understood that these examples are given by way of illustration and not of limitation:

Example I

To 72 grams of sodium penicillin G dissolved in 300 ml. of water, 200 ml. of cholorform and 18 cc. of concentrated hydrochloric acid were added. The mixture was cooled by the addition of 150 grams of ice. The mixture was stirred and then poured into a separatory funnel, the chloroform solution separating out shortly thereafter. The aqueous portion was further extracted with 50 cc. of chloroform and the combined chloroform solutions were dried over magnesium sulfate. 50 grams of N,N'-bis-p,p'-carbodiethylaminoethoxyphenyl urea were then dissolved in this dry chloroform solution of acid penicillin and the volume of the resulting solution was reduced to 155 cc. by evaporation under reduced temperature at a bath temperature of 35° C.

300 cc. of ether was added to the syrup thus formed and the resulting mass was thoroughly mixed. The solvent was decanted from the semisolid mass and then another 300 cc. portion of ether was added thereto. This was triturated until a suspension of solid occurred. The resulting suspension was chilled over night. The material was then recovered by filtration and dried under vacuum over sulfuric acid. The yield was quantitative. The resulting material assayed chemically about 800 u./mg., using the standard titrimetric method. The material is a white solid that swells and decomposes at about 75° C.

Example II 78 grams of potassium penicillin G was dissolved in 500 cc. of water and then 58 grams of N,N'-bis - p,p' - carbodiethylaminoethoxyphenyl urea hydrochloride dissolved in 500 cc. of water were added thereto, the mixture being stirred vigorously. The oil was separated from the solution and then the aqueous portion of this solution was extracted with 5–100 cc. portions of chloroform. The chloroform extracts and the oil were mixed and dried over sodium sulfate, and then the volume was reduced to 150 cc. by evaporation under reduced pressure at a bath temperature of 35° C.

300 cc. of ether was added to the syrup thus formed and the resulting mass was thoroughly mixed. The solvent was decanted from the semisolid mass and then another 300 cc. portion of ether was added thereto. This was triturated until a suspension of solid occurred. The suspension was chilled over night. The material was then removed by filtration and dried under vacuum over sulfuric acid. The yield was quantitative. The resulting material assayed chemically about 800 u./mg., using the standard titrimetric method.

While the foregoing examples and description have been directed to the preparation of a procaine urea penicillin compound wherein the penicillin component is identified as penicillin G, as indicated supra the invention is not restricted to this type of penicillin, as other penicillin procaine urea compounds are also considered to be within the purview of this invention.

Various changes and modifications of the invention as described above may be made which would still be within the scope thereof. Accordingly, such changes and modifications, to the extent that they are within the purview of the appended claim, are to be regarded as part of the invention.
We claim:
A new chemical compound having the formula:
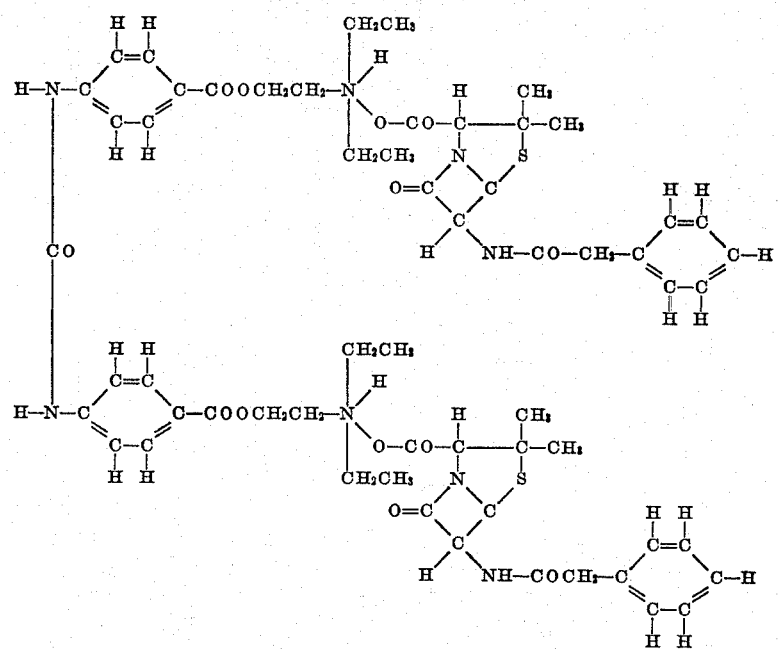
RALPH N. LULEK.
WILLIAM M. ZIEGLER.
References Cited in the file of this patent
UNITED STATES PATENTS
| Number | Name | Date |
|---|---|---|
| 2,515,898 | Rhodehamel | July 18, 1950 |